March 17, 1942.  F. PRANTL  2,276,870
RESILIENT WHEEL DRIVE FOR RAILWAY VEHICLES
AND LUBRICATING MEANS THEREFOR
Filed March 4, 1940

Fig. 1.

Fig. 2.

Inventor:
Franz Prantl,
By Potter, Pierce + Scheffler
Attorneys.

Patented Mar. 17, 1942

2,276,870

UNITED STATES PATENT OFFICE 2,276,870

RESILIENT WHEEL DRIVE FOR RAILWAY VEHICLES AND LUBRICATING MEANS THEREFOR

Franz Prantl, Wettingen, Switzerland, assignor to Aktiengesellschaft Brown, Boveri & Cie., Baden, Switzerland Application March 4, 1940, Serial No. 322,233
In Hungary March 7, 1939

4 Claims. (Cl. 105—131)

The present invention relates to wheel or axle drive mechanism for the propulsion of electrically driven railway vehicles.

The invention relates more particularly to that class of drive mechanism in which resilient coupling means are provided between the driving gear and the driven wheel and an object of the invention is to provide an improved resilient drive connection between the motor driven driving gear and the traction wheels comprising spider arms carried by the wheel or axle, said arms engaging spring members carried by the driving gear which spring members are disposed with their axes tangentially arranged and forming a polygon with the spider arms disposed at the angles thereof.

Another object of the invention is to provide an improved resilient drive mechanism in which resilient coupling springs are housed entirely within a driving gear journalled on a bushing sleeve fixed to the driving motor casing and in which coupling arms carried by the wheel or axle project through openings in the driving gear to engage bearing caps mounted at the ends of the springs and through which the driving forces are transmitted between the gear and the coupling arms.

Another object of the invention is to provide an improved automatic lubricating system for the drive connections.

A further object of the invention is to provide a central closed-circuit lubricating system supplying lubricant by gravitation and centrifugal action from a lubricant sump provided by a housing for the drive mechanism and in which the lubricant is returned to the sump for recirculation.

Other objects and advantages of the invention will be apparent from the following detailed description with reference to the accompanying drawing in which:

Fig. 1 is a vertical central section, partially in elevation, at right angles to the axis of the drive mechanism, and Fig. 2 is an irregular sectional view on the line 2—2 of Fig. 1.

Referring more particularly to the drawing, 5 indicates the driving wheels which are mounted on a driving axle 6 provided with journals 7 at opposite ends adapted to be mounted in suitable journal boxes, not shown. A bearing bushing or quill 8 surrounds the axle 6 between the driving wheels, the bushing 8 being coaxial with the axle 6 and dimensioned to provide a clearance around the axle sufficient to allow for movement of the axle relative to the frame of the vehicle. The bushing 8 is rigidly connected with the driving motor casing, not shown.

A gear wheel 9 is journalled on the end of the bushing 8, being mounted on two self-aligning roller bearings 10 arranged adjacent each other.

The gear wheel 9 is formed with an annular recess 11 in the inner side thereof between the toothed rim 12 and the hub portion 13 thereof. This annular recess is enlarged at regular intervals to provide a plurality of spring casings or housings 14, preferably rectangular in cross section, for helical coupling springs 15. Bearing plates or caps 16 are provided at the ends of the springs, being retained in position by the shoulders at the ends of the spring housings 14. The bearing plates 16 are square to have a sliding fit in the spring housings 14.

The use of the two self-aligning roller bearings in the manner shown, retains the gear wheel continuously in centered position against lateral displacement and wear is negligible as compared with that of plain bearings. Good results may also be obtained with the use of tapered roller bearings or one roller bearing and one ball bearing. If plain bearings are used for the gear wheel lubricating pads are provided on both sides in the fixed quill 8 to provide adequate lubrication.

A spider 17 formed with a plurality of laterally projecting arms 18 is rigidly mounted on the inner side of the driving wheel 5. The arms 18 extend through openings 19 in the web of the gear 9 into the annular channel 11 between adjacent spring housings and bear at opposite sides against adjacent bearing plates 16 as seen in Fig. 1. The open side of the annular channel is closed by an annular cover plate 20 which is bolted or otherwise secured to the gear body.

As seen in Fig. 1, the spring housings or casings 14 have parallel side walls and are disposed tangentially with respect to the axis of the gear, forming the sides of a polygon with the arms 18 of the spider occupying the angles between the sides.

It is important that the driving torque between the motor pinion in mesh with gear 9 and between the gear wheel and the arms 18 be applied at points which lie between the outer ends of the roller bearings 10 and preferably, as in the embodiment illustrated, these forces are applied in a plane between the center planes of the bearings.

The gear 9 and the motor pinion, not shown, in mesh with the teeth 12 are enclosed in a two-part gear box or housing 21 which is preferably made of sheet metal parts welded together to form a drum-shaped enclosure. The housing 21 is partially filled with oil 22 into which the gear 9 dips. Oil collecting pockets 23 are provided on the inner surface of the circumferential wall 24 of the housing 21 intermediate the top and bottom of the same so as to collect oil splashed and thrown against the circumferential wall by the gear 9. The collecting pockets 23 discharge the oil through openings 25 in the side wall of the housing 21 into a channel 26, preferably welded to the side of the housing. The channel 26 passes beneath the bushing 8 and is provided with an overflow nozzle or spout 27 which discharges the oil into an annular gutter 28, concentric with and carried by the gear wheel 9. The gutter 28 is in the form of an inturned rim or flange carried by the hub of the gear wheel and may be secured to the cover plate 20 by welding.

The hub of the gear wheel 9 is drilled to provide lubricant passages 29 and 30 leading from the bottom of gutter 28 and discharging into the spring housings and to the points of contact between the arms 18 and bearing caps 16, the oil being delivered to these points from the gutter 28 by centrifugal force when the gear is rotating. The excess of oil delivered to the parts disposed within the channel 11 escapes through the openings 19 and is thrown onto the cylindrical wall 31 of the housing 21 and flows back to the sump at the bottom of the housing. Thus a continuous circulation of oil is provided during running of the vehicle.

To prevent escape of oil through the side of the housing toward the driving wheel, a labyrinth seal 32 is provided consisting of spaced radial splash discs 33 carried by the hub of the spider 17 and stationary trap discs 34 carried by the wall 31 of the casing and interleaved with the discs 33. The discs 34 are provided with oil collecting grooves 35 on their inwardly directed faces and sufficient clearance is provided between the discs 33 and 34 to accommodate normal relative movements between the wheel and vehicle frame. A felt or other suitable sealing ring 36 seals the inner annular wall of the casing around the bushing 8. Sealing rings 37 and 38 are also provided at the sides of the roller bearings 10.

Since roller bearings require only a small amount of clean oil for proper lubrication, oil may be supplied to them through openings 39 in the spacing ring 40 to which it flows by capillary attraction through a wick, not shown, dipping into the oil sump. The feed wick acts also as a filter for the oil thus supplied to the bearings 10. Also, oil may be supplied to the roller bearings by wick feed from the passages 29 and 30 of the annular recess in the gear wheel 9.

Although a preferred embodiment of the invention has been shown and described by way of illustration, it will be understood that various modifications and changes in the details of construction may be resorted to without departing from the spirit of the invention within the scope of the appended claims.

I claim:

1. In drive mechanism for electrically driven railway vehicles of the type comprising a driving axle, wheels mounted on the ends of said axle, a bushing surrounding said axle, a gear wheel journalled on one end of said bushing adjacent one of said axle wheels, torque transmitting connections between said gear and axle wheel comprising helical springs carried by said gear wheel and coupling arms carried by said axle wheel extending between and bearing against opposed ends of adjacent springs, and a casing enclosing said gear wheel and providing an oil sump into which said gear dips, the combination with said gear of oil passages leading from the hub portion thereof to said springs for forcing oil by centrifugal force to said springs, means for collecting oil thrown onto the casing wall and for conveying the collected oil by gravity flow to the inlet ends of said oil passages, and means for returning excess oil supplied to said springs to said sump by gravity flow.

2. In drive mechanism for electrically driven railway vehicles of the type comprising a driving axle, wheels mounted on the ends of said axle, a bushing surrounding said axle, a gear wheel journalled on one end of said bushing adjacent one of said axle wheels, torque transmitting connections between said gear and axle wheel comprising helical springs carried by said gear wheel and coupling arms carried by said axle wheel extending between and bearing against opposed ends of adjacent springs, and a casing enclosing said gear wheel and providing an oil sump into which said gear wheel dips, the combination of an annular gutter carried by the hub of said gear with the open side of said gutter facing the axis, said gear body having oil passages leading from said gutter to said springs and to the bearing points between said springs and said arms, and means for supplying oil from said sump to said gutter comprising means for collecting oil thrown by said gear onto the casing wall and for conveying the collected oil by gravity flow to said gutter.

3. In drive mechanism for electrically driven railway vehicles of the type comprising a driving axle, wheels mounted on the ends of said axle, a bushing surrounding said axle, a gear wheel journalled on one end of said bushing adjacent one of said axle wheels, torque transmitting connections between said gear and axle wheel comprising helical springs carried by said gear wheel and coupling arms carried by said axle wheel extending between and bearing against opposed ends of adjacent springs, and a casing enclosing said gear wheel and providing an oil sump into which said gear wheel dips, the combination of an annular gutter carried by the hub of said gear with the open side of said gutter facing the axis, said gear body having oil passages leading from said gutter to said springs and to the bearing points between said springs and said arms, and means for supplying oil from said sump to said gutter comprising an oil collecting pocket carried by the wall of said casing for collecting oil thrown onto said wall by said gear and a channel leading from said oil pocket and discharging into said gutter.

4. In drive mechanism for electrically driven railway vehicles of the type comprising, a driving axle, wheels mounted on the ends of said axle, a bushing surrounding said axle, a gear wheel journalled on one end of said bushing adjacent one of said wheels, a plurality of helical springs mounted within the body of said gear wheel and disposed with the axes thereof tangentially directed and forming the sides of a polygon, projecting coupling arms carried by said axle wheel engaging opposed ends of adjacent springs, and a combined casing and oil sump enclosing said gear wheel, helical springs and the ends of said arms, the combination with said gear wheel of lubricant passages leading from the hub portion thereof to said spring housings and into the spaces between the ends of said springs, and means for collecting lubricant thrown against the wall of said casing by rotation of said gear and for conveying the collected lubricant by gravity flow to the inner ends of said passages.

FRANZ PRANTL.